United States Patent [19]

Rostad

[11] 3,895,275

[45] July 15, 1975

[54] ELECTRONIC CONTROL SYSTEM FOR MOTORS AND THE LIKE

[76] Inventor: Rolf A. Rostad, P.O. Box 72, McCloud, Calif. 96057

[22] Filed: July 29, 1974

[21] Appl. No.: 492,491

Related U.S. Application Data

[63] Continuation of Ser. No. 357,863, May 7, 1973.

[52] U.S. Cl. .............. 318/227; 318/230; 323/24; 323/34
[51] Int. Cl. ............................................ H02p 5/40
[58] Field of Search ...... 318/227, 229, 230; 323/24, 323/34

[56] References Cited
UNITED STATES PATENTS

| | | | |
|---|---|---|---|
| 3,189,810 | 6/1965 | MacGregor | 318/227 |
| 3,506,899 | 4/1970 | Graham | 318/227 |
| 3,573,579 | 4/1971 | Lewus | 318/227 X |
| 3,581,171 | 5/1971 | Baranov et al. | 318/227 |
| 3,652,924 | 3/1972 | Dieterich et al. | 323/34 X |

*Primary Examiner*—G. Z. Rubinson
*Attorney, Agent, or Firm*—Phillips, Moore, Weissenberger, Lempio and Strabala

[57] ABSTRACT

A controller for a motor or like electrical equipment. A thyristor in series with a power conductor that feeds the equipment and a control circuit for activating the gate terminal of the thyristor in accordance with the operating conditions of the equipment. The control circuit includes a transformer having a secondary winding connected to the gate terminal and means for varying the current flow in the secondary winding according to load demands. A three phase system having a thyristor in each conductor and a transformer secondary winding for each thyristor, which windings are on a common core.

14 Claims, 12 Drawing Figures

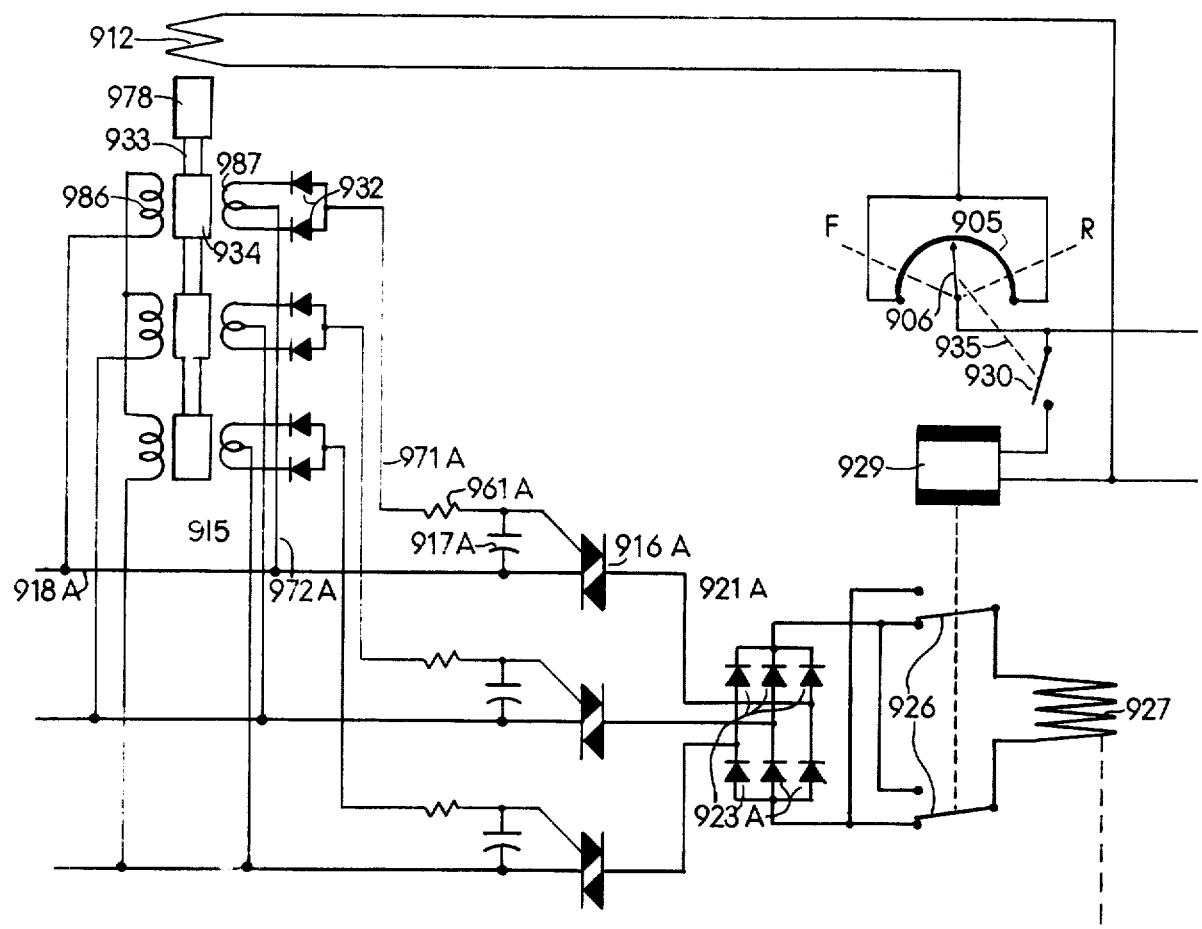
FIG. 9
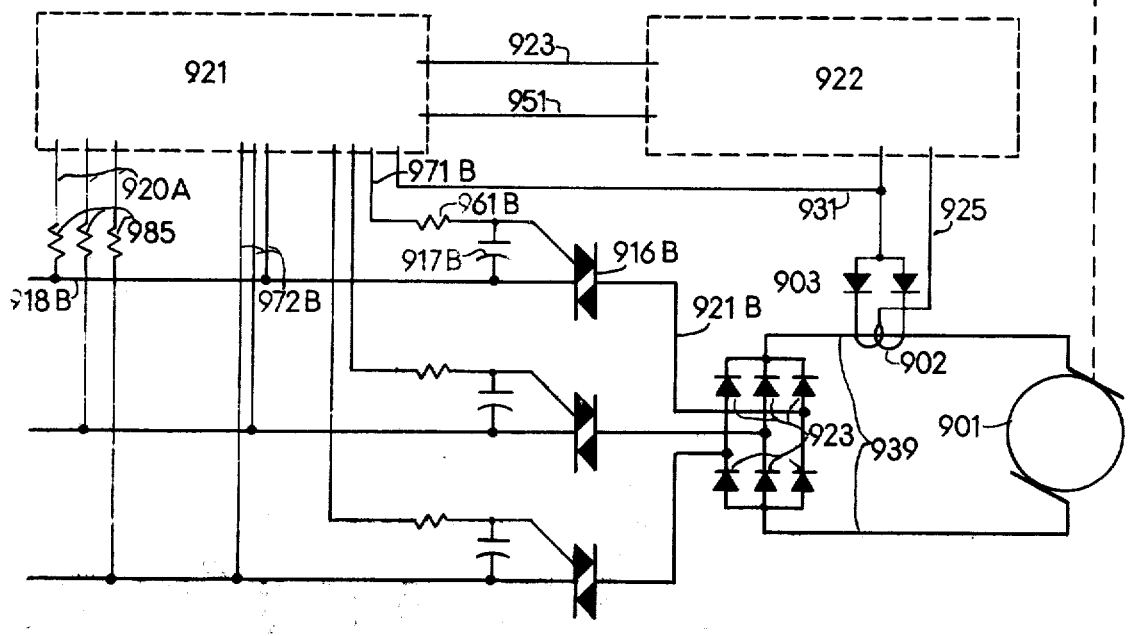

ELECTRONIC CONTROL SYSTEM FOR MOTORS AND THE LIKE

This is a continuation of Ser. No. 357,863, filed May 7, 1973.

BRIEF SUMMARY OF THE INVENTION

This invention relates to electronic means of controlling functions of an electric motor or other electric load.

According to the present invention there is a control transformer that has a core, a primary winding on the core, and a secondary winding on the core. The secondary winding is connected to the gate terminal of a thyristor which is connected in series with one of the power conductors to a load, such as a motor. The current induced in the secondary windings controls the thyristor which in turn controls the power to the load.

For controlling the magnitude and timing of current induced in the secondary winding, the present invention provides several expedients. In each, a dropping resistor in series with the primary winding is employed so that the voltage across the primary winding increases as the current through the series combination decreases. One expedient for effecting change in secondary current is embodied in an auxiliary winding on the core and circuitry for controlling current flow through the auxiliary winding to alter the degree of saturation in the core. Altering the degree of saturation in the core alters the load on the primary which in turn alters the current flow through the primary, the voltage across the primary, and finally, the voltage induced across the secondary winding.

Another expedient for controlling the magnitude and timing of current induced in the secondary is the employment of a split core and one or more ferrous bodies that are moveable between two or more positions to effect variation in the degree of flux linkage between a primary portion of the split core and a secondary portion of the split core.

For controlling the position of the ferrous body or the current flow through the auxiliary winding, the invention includes control circuitry that responds to load and/or speed conditions dictated by the nature of the load and the ratings of the equipment (e.g., a motor) to which power is supplied through the system of the invention. Exemplary of the functions performed by the control circuitry are regulation of current to the load during start, during initial warm-up, during load changes, and during overload. The control circuitry also affords reversal of polarity or phase relation, such as is useful in reversing the direction of rotation of electric motors. Since the control functions are performed electronically at relatively low power levels, the invention can be accommodated to virtually any load in any environment.

It is an object of this invention to provide a solid state starting control for an induction motor with a controlled starting time and regulated maximum current.

One object of this invention is to provide a solid state motor controller with a manual contact less reversible function, with controlled current regulation, and instant current overload protection.

One more object of this invention is to provide for a solid state motor protection system controllable to fit the desired protection level of each motor.

A further object of this invention is to provide several separate functions in an overload control.

At the moment a motor is started, a higher current is required to force a motor in motion than when a motor's speed is maintained in motion. Therefore, this invention provides for means of introducing a predetermined starting sensitivity value rated to the maximum starting current of the motor, and to the normal starting time.

A separate adjustable means is then provided to monitor the normal load current of a motor with a time delayed means to allow for normal current surges from peak loads on the motor.

One more object of this invention is to provide for a temperature corrective device regulating the sensitivity of the overload control.

A machine when started up cold will consume a higher current until heated up by friction within the mechanical components.

To compensate for this added load, the temperature corrective device will cause the overload control circuit to monitor the motor current with a slightly decreased sensitivity during the first few minutes of operation. However, a separate heat source will heat up the temperature sensitive device after a predetermined length of time close to the time required for the machine to heat up. As the temperature sensitive device heats up, the internal resistance of the device is lowered to increase the sensitivity of the overload control.

Another object of the overload control circuit is to provide a rapid discharge of the capacitor which is a useful feature when the current pulses from the motor are not high enough in amplitude or in duration to trigger the tripping device.

As soon as the current charging the capacitor is lowered to a predetermined minimum level, a voltage sensitive network functions to discharge the previously charged voltage in the capacitor.

One more specific object of this invention is to provide an electronic circuit controlling the current in the secondary rotor windings of an induction motor. The circuit components may be placed in an epoxy mold and fastened to the end of the rotor shaft where the three current switching semiconductor components may be inserted in a cast aluminum rotor cooling fan which will function as a most efficient heat sink.

A still more specific object of the invention is to provide an adjustable constant speed control performing unaffected by normal load conditions.

One further object of this invention provides for a self-regulated current control circuit which is adjustable to enable a motor to operate at a regulated maximum current, and with a constant torque at all speeds.

Accordingly, the primary object of this invention is to provide all means desirable in the controlling of an AC motor at a far greater simplicity than previously possible. All the functional adjustments through the magnetic, resistive or voltage-sensitive means in the aforementioned adjustments may be assumed to be constructed with external resistive controls. Each control requires one slip ring with one conductor and resistance variable against ground potential.

One more objective is added to this invention by providing the overload functions in the aforementioned circuits as overload control means for AC and DC motor control circuits.

Other objects and advantages of this invention will become apparent from a review of the drawings and the following specification.

BRIEF DESCRIPTION OF THE DRAWINGS

FIG. 9 illustrates a fragmentary view of the AC motor controllers similar to as shown in FIG. 1 modified to control the function of a DC motor.

DESCRIPTION OF THE PREFERRED EMBODIMENTS

Figure 1:
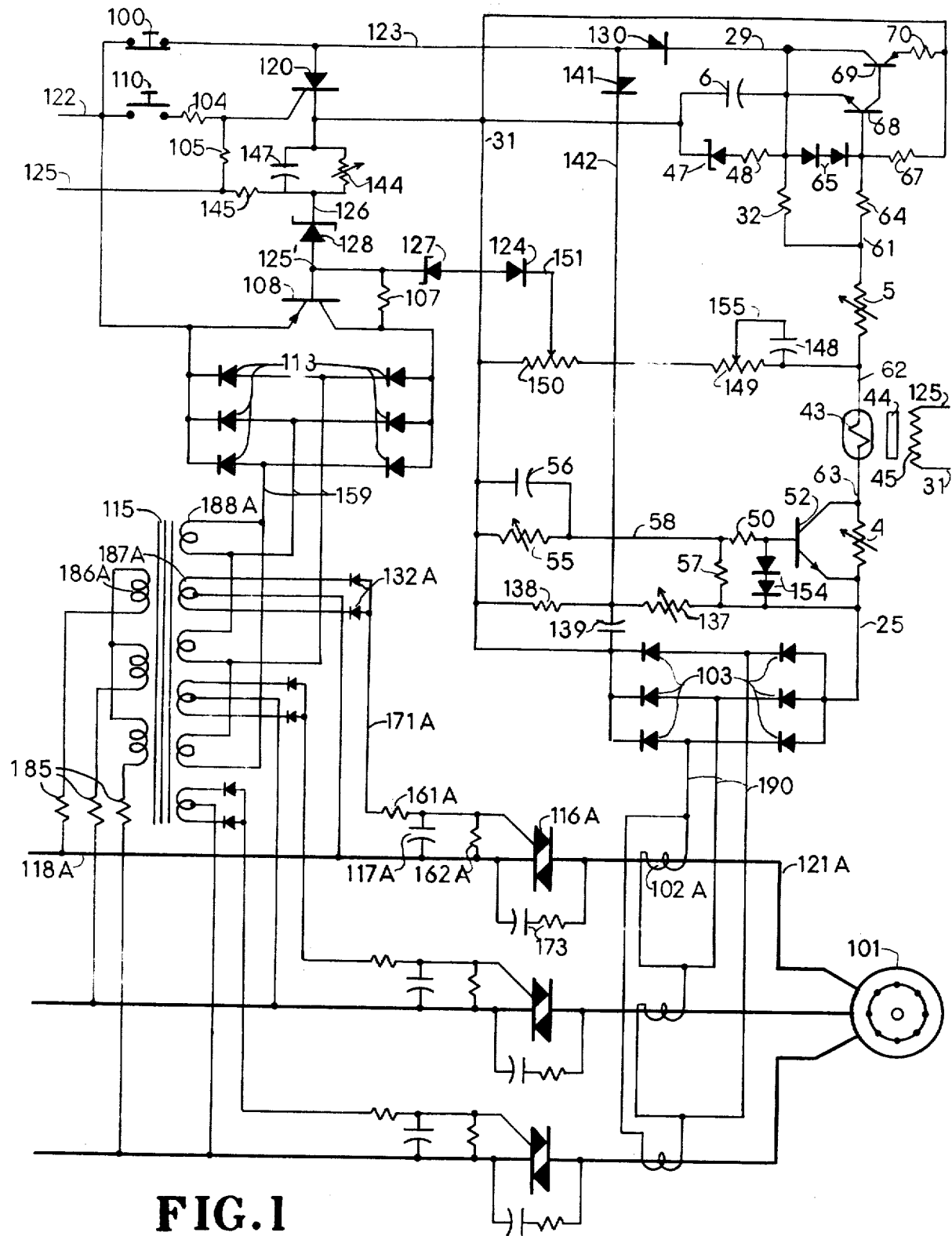
FIG. 1 is a schematic representation of a solid state motor controller of a three-phase induction motor showing an electronically variable transformer. An electronic start and stop circuit controlling the variable transformer with controlled starting time. An instant current trip circuit. An adjustable constant torque circuit. A capacitor discharge circuit. An adjustable starting sensitivity control. An electronic overload control with temperature compensated sensitivity controlling the start and stop circuit.

In the following detailed description of the preferred embodiments of the present invention, similar reference numerals are used to designate elements in the various views that are structurally or functionally similar, unless the context clearly indicates otherwise. The last two digits in the reference numerals are common insofar as the elements have structural or functional similarity. For example, in FIG. 1 there is a transformer 115 that is functionally similar to transformer 215 in FIG. 2, transformer 415 in FIG. 4 and transformer 1215 in FIG. 12.

Referring to FIG. 1, a three phase electronic motor starter is accomplished by employment in each phase of a controller bidirectional thyristor 116, known as "triac," to control the AC motor current in each phase. For simplicity, it is to be assumed the thyristor contains the "Diac" thyristor diode as a voltage regulating means built into its gate circuit. The thyristors 116A, B and C are controlled through full wave phase shifting of the AC sine wave at the control gate of each thyristor by the function of the electronically variable transformer 115. As the three phase voltage appears at motor feed conductors 118A, B and C, the primary windings 186A, B and C of transformer 115 are energized through respective voltage controlling resistors 185A, B and C. The AC voltage induced in the secondary-delta connected windings 188A, B and C is rectified full wave through diodes 113, and transistor 108 is switched on saturated by a negative voltage on conductor 125 through resistor 107. The resulting load on transformer 115 produces a voltage drop across primary series resistors 185, and the voltage induced by the secondary windings 187A, B and C does not reach sufficient amplitude on capacitors 117A, B and C to turn on respective thyristors 116 through resistors 161A, B and C. To start motor 101, push button 110 is depressed, and the positive voltage on conductor 122 through resistor 104 switches silicon controlled rectifier 120 known as "thryristor on." The positive voltage on conductor 122 through the normally closed stop button 100 and conductor 123 through SCR 120 appears at conductor 31 charging capacitor 147. The negative side of capacitor 147 is briefly charged from negative conductor 125 through resistor 145. However, as capacitor 147 is fully charged, the stored voltage is discharged across variable starting time resistor 144 at a time rate predetermined by the set value of said resistor.

As capacitor 147 is discharged, a positive voltage builds up rapidly on conductor 126. As the rising voltage on conductor 126 approaches the maximum voltage, the rate of the rising voltage is slower. At that predetermined voltage level, zener diode 128 conducts, and conductor 125', connected to the base of transistor 108 changes from negative to a more positive voltage which functions to turn off transistor 108, and in turn to desaturate the core of transformer 115. This decreases the voltage drop across the primary voltage regulating resistors 185, and the rising voltage on the three phase star connected primary windings 186 induces a rising voltage in the secondary coils 187 which is rectified full wave through diodes 132 thereby providing thyristors 116 with a negative gate current and voltage for the positive as well as for the negative switching cycle of the thyristors to comply with the manufacturer's recommended operation of the thyristors. Also to compensate for the phase shift between line current and line voltage which appears during inductive loads, the dv/dt is limited by a manufacturer's RC circuit 173 connected in parallel with thyristors 116.

As the negative voltage charging capacitor 117 reaches the triggering voltage level of thyristor 116, the thyristor conducts at a maximum phase shifted sine wave with a time delay predetermined by resistors 161 and the instantaneous voltage induced in secondary windings 187, which is predetermined by the inductive reactance in the gradually unsaturated magnetic core of transformer 115 and primary voltage regulating resistors 185.

As the conduction across the emitter-collector region of transistor 108 decreases, transformer 115 offers less resistance, and capacitors 117 trigger thyristors 116 with a less phase shifted voltage until the entire sine wave is conducted to motor 101.

Assuming induction motor 101 is started in this manner, the rapidly rising voltage across the three phase motor terminals will start the rotation of the motor rotor at a voltage value predetermined by the load conditions on the motor. At the first movement of the rotor, a counter electro-motive force is generated in the stator windings of motor 101 serving to reduce the motor starting current. The rapidly increasing speed of the rotor further increases the counter electro-motive force, and a lower starting current is obtained amounting to a fraction of the current consumed when a motor is started with a regular motor contactor. Since induction motor 101 may be started at a pre-adjusted time rate by adjusting resistor 144, an invaluable function is obtained to save the wear and tear of mechanical parts.

The FIG. 1 overload control is accomplished by connecting current transformers 102 to each phase. The current picked up by the transformers is conducted via conductors 190 to rectifiers 103 which cooperate with other circuit elements to control a transistor 52.

Figure 8:
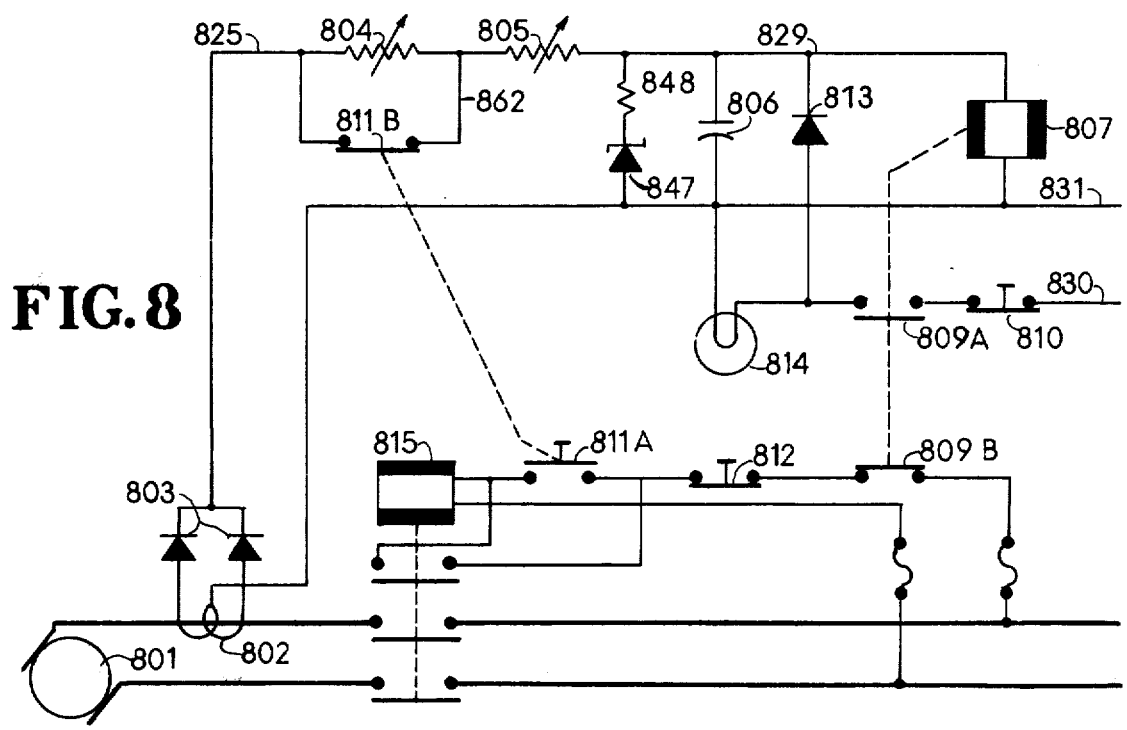
FIG. 8 is a schematic showing a basic function of an overload control.

Transistor 52 serves a similar function to the manual push button contact 810 in FIG. 8. In FIG. 8 when the motor 801 is started by depressing start button 811, the contact is opened momentarily introducing the variable resistor 804 into the motor overload control circuit. The predetermined value of resistor 804 is rated to allow for the normally high starting current of motor 801. However, motor starter button 811 must be depressed long enough for the motor starting current to decrease to the running current value, which is normally less than one second. The electronic circuit in FIG. 1 is arranged to maintain transistor 52 in a normally saturated state thereby shorting out starting sensitivity resistor 4. Two voltage reference diodes 154 are connected in series to provide a regulated voltage sufficient to energize transistor 52 and enables the transistor to remain energized during the lowest operating motor current. The remaining voltage appears as a voltage drop across a variable resistor 55, and a current limiting resistor 50. When motor 101 is started, a rectified DC voltage appears between conductors 31 and 25. A capacitor 56 instantly attracts the opposite polarity, causing a current flow through resistor 57 which provides a negative voltage to keep transistor 52 turned off for a predetermined length of time. This function introduces the pre-set resistance value of the variable resistor 4 into the overload control circuit resulting in a decreased sensitivity to allow for the normally higher starting current of motor 101. Capacitor 56 will discharge at a time rate predetermined by the set value of the variable resistor 55 and since the variable resistor 55 is of a lower value than resistors 57, the voltage at conductor 58 will change to positive. As a result, transistor 52 becomes saturated, and resistor 4 is shunted out of the circuit.

When the motor 101 reaches full speed, the sensitivity of the overload control is determined by the set value of resistor 5 which is rated to the maximum load of the motor, or to any desired lesser load level. The sensitivity is also automatically adjusted by the function of thermistor 43. When a motor driving a machine (not illustrated) is started up cold, the current required is usually higher during the first minutes while its mechanical parts are being warmed up by internal friction. As the motor is started, the heating element 45 is energized by power from conductors 31 and 125. A heat resistive body 44 is provided as a means to delay heating of thermistor 43 so that as the motor heats up, thermistor 43 is correspondingly heated, and the resistance thereof decreases. In order to achieve more stable performance of the overload control, a zener voltage reference diode 47 in series with a resistor 48 is provided to function as a nonlinear resistor. As the voltage rises above the rated reference voltage of diode 47, the diode will conduct to maintain the same voltage level. Therefore a voltage rising at an even rate will reduce to a slower rise time as a result of the increasing load of the nonlinear resistance of resistor 48 and zener diode 47.

Since only a small voltage drop is desired across resistor 48, a low resistance value is preferred. If the voltage across capacitor 6 rises to the predetermined trip level of the four layer thyristor diode 130, the diode will fire instantly to discharge capacitor 6. Such discharge causes a reverse polarity across SCR 120, and the SCR turns off, permitting a negative voltage across resistor 107 to energize transistor 108. The instantaneous load on transformer windings 188 increases the voltage drop across primary load resistors 185, and the induced voltage in secondary windings 187 drops below the triggering level of bidirectional thyristors 116.

If the voltage in the aforementioned circuit of capacitor 6 fails to reach the rated trip value of thyristor diode 130 and the motor current decreases to a lower level, an electronic discharge circuit for capacitor 6 functions instantly to discharge the capacitor to a lower voltage level corresponding to the operating level of motor 101. This provides a maximum RC time constant to function in a motor control circuit where the motor current appears with current surges of short duration in rapid succession.

The electronic discharge circuit comprising resistor 32 develops a voltage drop that produces a negative bias to keep the electronic discharge circuit turned off. As the motor current decreases, the negative voltage at conductor 61 will appear more positive in respect to the negative voltage stored in capacitor 6 and appearing on conductor 29. A positive voltage from conductor 31 across resistor 67 will turn on the direct coupled amplifier comprising a transistor 68 which turns on transistor 69 to discharge capacitor 6 through peak current load resistor 70. As capacitor 6 is discharged to a level where the voltage at conductor 61 is more negative than the remaining capacitor voltage, the resulting negative voltage on conductor 61 through resistor 64 will turn off transistors 68 and 69. The required voltage drop across resistor 32 to control the elecronic discharge circuit is predetermined by transistor 68 biasing network comprising resistors 64 and 67. Diodes 65 function to protect the emitter-base junction of transistor 68 against reverse voltage breakdown.

The electronic overload circuit represented as part of the electronic motor control unit in FIG. 1 provides a means for instantaneous current protection of the bidirectional thyristors 116. Before the current in conductors 118 and 121 rises to the maximum rated value of thyristors 116, the aforementioned circuit comprising variable resistor 137 charges capacitor 139 to the voltage level where the four layer thyristor diode 141 will fire to turn off the latched SCR 120 in a similar manner as thyristor diode 130. Resistor 138 functions as a discharge path for capacitor 139 and enables variable resistor 137 to provide adjustment to the aforementioned instant current control.

One more function is added to the FIG. 1 overload control enabling motor 101 to operate at a constant maximum torque at any adjusted current level. Potentiometer 150 can be adjusted to operate motor 101 with a regulated torque and instantaneous current control by regulating potentiometer 149 to zero time delay, or if desired, the time delay potentiometer may be set to permit a higher current to handle load surges. In case of a rising current in motor conductors 118–121, a negative voltage appears on conductor 62. Capacitor 148 attracts a positive voltage from conductor 31 through potentiometer 150, and causes a time delay to prevent an instantaneous regulation of motor current peak loads. However, as soon as capacitor 148 has discharged across the predetermined resistance-value set on potentiometer 149, a more negative voltage in respect to the negative base conductor 126 appears on conductor 151, and as soon as the negative voltage rises to the rated conduction level of zener diode 127, the diode conducts to regulate transistor 108 to a conduction level where the motor current is reduced below the feed back voltage value of zener diode 127. The function of blocking diode 124 is to prevent a rising positive voltage from charging capacitor 148 from regulating transistor 108.

Figure 2:
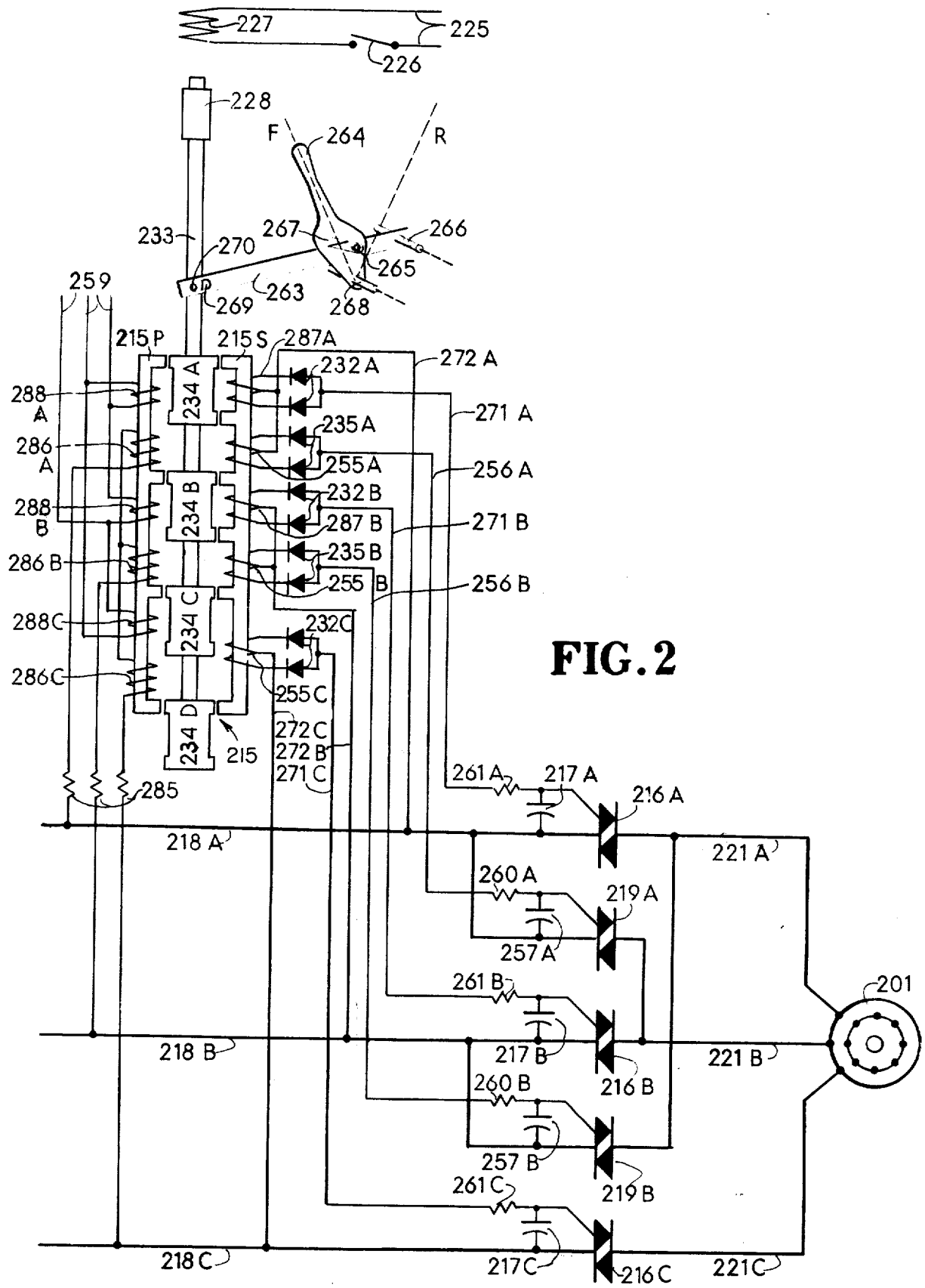
FIG. 2 is a fragmentary view of an electronic motor controller similar to FIG. 1. A selective variable transformer is shown, operable by electronic, mechanical and magnetic means.

FIG. 2 is a partial illustration representing a modified version of the FIG. 1 electronic motor control.

An electronically and mechanically variable transformer is incorporated in the thyristor control circuit to provide a manual operation of the forward and reverse direction of the motor rotor, and a manual speed control. The electronically variable means of transformer 115 in FIG. 1 is also provided in the variable transformer 215 of FIG. 2, and controlled through conductors 259 by an electronic overload control similar to that connected to conductors 159 in FIG. 1, and therefore not illustrated.

When motor 201 is operated by the aforementioned manual control, starting sensitivity resistor 4 of FIG. 1 and the controlling circuit can be omitted, or adjusted to a low resistance value. Also the electronic circuit controlling capacitor 6 and thyristor diode 130 can be omitted, and motor 201 can be controlled by current regulation through the function of potentiometer 150. If a zero time delay is set by the function of potentiometer 149 and capacitor 148, motor 201 can be started manually with variable transformer control arm 264 with an instantaneous current regulation, and transformer control arm 264 can be switched directly from full speed forward to full speed reverse with the predetermined torque value providing braking power and time rate for reversing speed. As motor 201 is started by a starting control circuit similar to that activated by starter button 110 in FIG. 1, the aforementioned function de-energizing transistor 108 serves to decrease gradually the DC current rectified by diodes 113 from the three phase conductors 159 which correspond to conductors 259 in FIG. 2. As the AC current through transformer windings 288 decreases, the voltage drop across the voltage regulating resistors 285 decreases, and the rising voltage across primary windings 286 induces a rising voltage in the secondary windings 255A, B and C. The rising AC voltage induced in winding 255A is rectified full-wave through diodes 235A, and through conductor 256A and phase shifting resistor 260A charges capacitor 257A with a voltage which initially represents a maximum phase shifted voltage to trigger thyristor 219A into conduction serving to switch motor feed conductor 218A to motor conductor 221B. Meanwhile, the rectified voltage induced in the windings 255B functions to trigger thyristor 219B switching motor feed conductor 218B to motor conductor 221A. This mode of operation completes the phase reversing action induced by transformer windings 255A and B. The electromagnetic flux generated by primary windings 286 flows through the sections of the iron core associated with secondary transformer windings 255A, B and C; the electromagnetic flux is diverted to bypass the sections of transformer iron cores associated with coils 287A and 287B. In addition, the electromagnetic flux that is diverted represents the same direction of flow, and therefore functions to affect the degree of saturation of the magnetic core. To change the direction of motor rotation, the manual control handle 264, pivoting on stationary shaft 268, is switched from position F to position R. This moves control arm 263, pivoting on stationary shaft 266, in an upward motion by the sliding motion of protruding shaft 265 in a non-tangent elongated slot 267 of control handle 264. The resulting upward motion of control rod 233 caused by the protruding pin 270 sliding in the elongated slot 269 functions to move the ferrous cores 234 to the upper seated position. The lower protruding section of ferrous core 234A functions to bridge the upper air gap between the primary and the secondary side of transformer 215. The ferrous core 234B moves up to bypass the magnetic flux flowing in the section of the core that extends through coil 255A, while the lower protruding section of core 234B bridges the air gap between the primary and secondary side of pole pieces located between primary phase windings A and B. Ferrous core 234C moves up to bypass the magnetic flux flowing in the section of the core that extends through coil 255B, while its lower protruding section bridges the air gap of the pole pieces located between primary phase windings B and C. The ferrous core 234D moves up to a position at which the lower protruding section replaces the upper section thereby leaving secondary coil 255 unaffected. As the ferrous cores are moved from their respective positions, all secondary coils 255 and 287 become de-energized from lack of magnetic flux causing all thyristors to remain de-energized until the ferrous cores are seated in their new positions. However, the phase shifting of the thyristors may be controlled by moving ferrous cores 234 between their extreme positions. A remote control means is provided for the forward and reverse operation of transformer 215 by the function of electro-magnet 227 acting on ferrous core 228 mounted on control rod 233. Manual control arm 263 can be removed from the protruding pin 270, and magnet 227 operated from an external power source through conductors 225 by switch 226.

Figure 3:
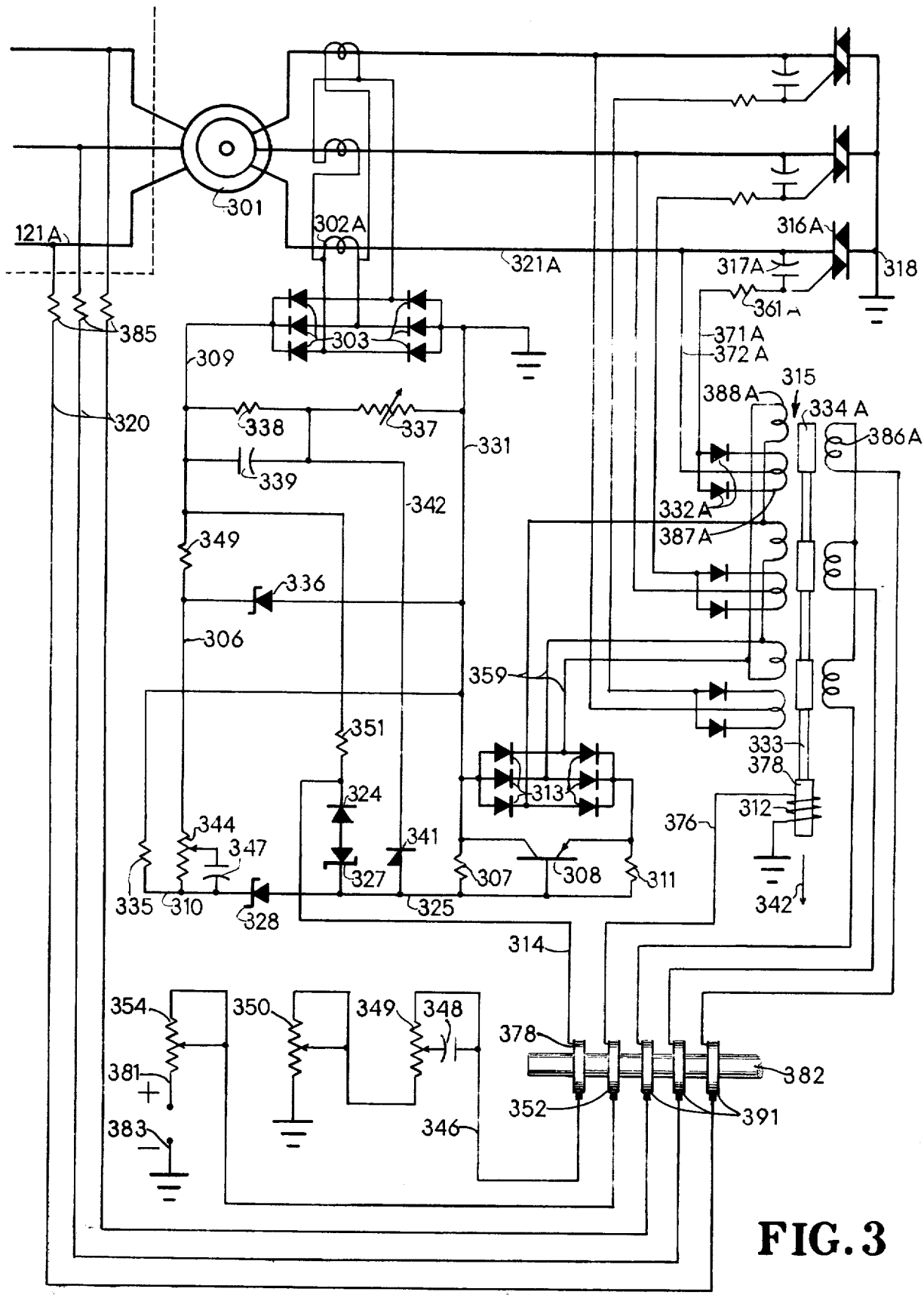
FIG. 3 is a schematic view showing an electronic rotor control circuit having several adjustable means controlling a multitude of functions of a rotor. A variable inductive means provides a constant speed with an external speed control.
Figure 4:
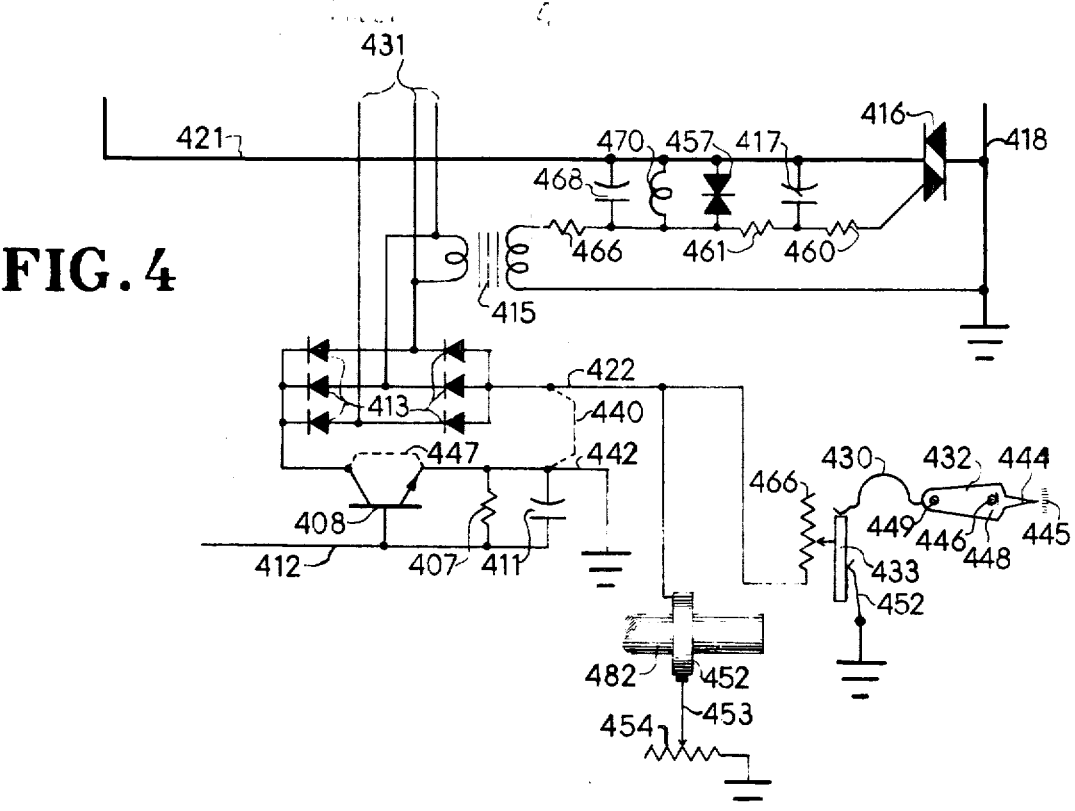
FIG. 4 represents a fractional view of an electronic rotor control circuit similar to FIG. 3 having a different thyristor control means, and a resistive constant speed control.
Figure 5:
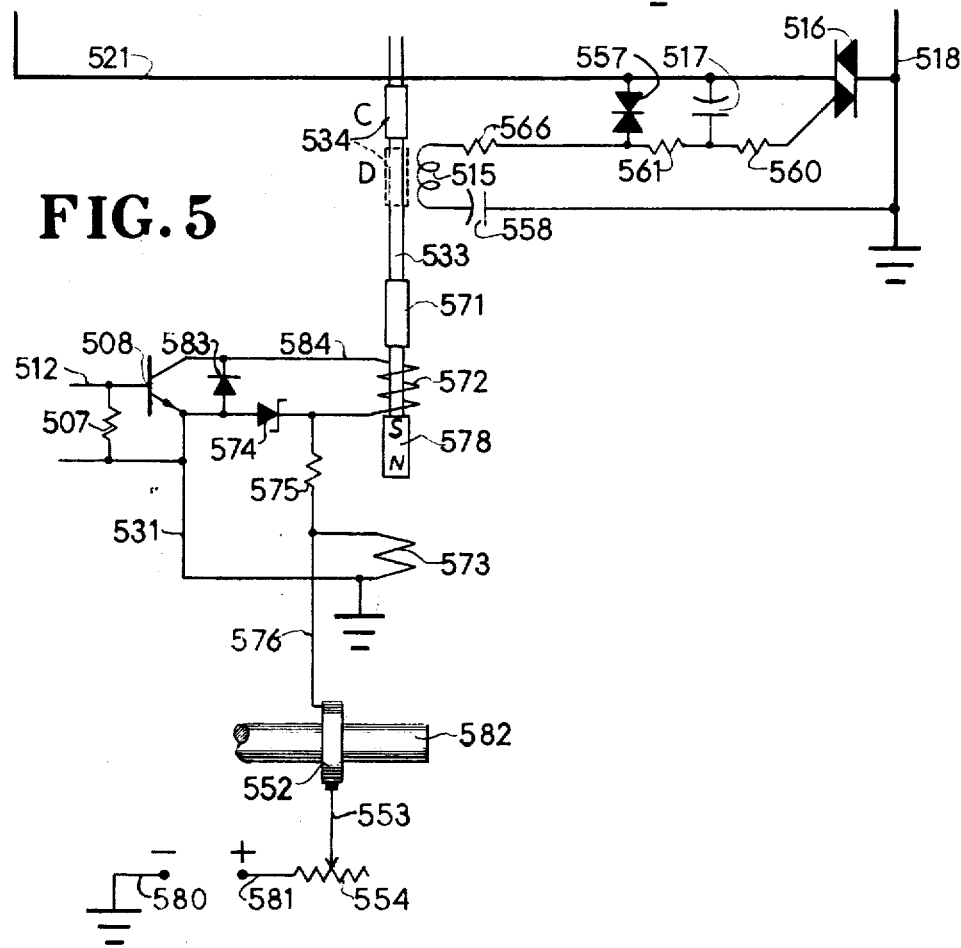
FIG. 5 represents a fractional view similar to FIG. 4, showing a different magnetic-inductive control means of the electronic rotor control circuit.

FIG. 3 shows a bidirectional thyristor controlled circuit similar to FIG. 1 used to control the functions of a rotor-wound induction motor. The rotor control circuits shown in FIGS. 3–4 and 5 are designed to provide several new features to the performance and function of the motor, and greatly improve the economy of using a slip ring induction motor by eliminating the wasted power in the present high current load resistors used for rotor speed control. In the design of the electronic rotor control circuit, the anode of the aforementioned thyristors are designed with common potential, and may be pressfitted into the body of the cast aluminum cooling fan of the rotor to function as a most practical and efficient heat sink at ground potential. The controlling transformers are of miniature size, and the entire circuit can be placed in a circular mold filled with epoxy resin, and mounted next to the thyristors around the rotor shaft. The primary voltage is assumed to be supplied to motor 301 by the primary motor conductors 121 of FIG. 1 motor controller, and marked by a phantom line in FIG. 3.

The primary voltage through voltage regulating resistors 385 is fed through voltage regulating resistors 385 is fed through conductors 320 and rotor slip rings 391 to the primary windings 386 of variable transformer 315 controlling thyristors 316 in a similar manner as transformer 115 controls thyristors 116 in FIG. 1. A variable inductive means is provided to regulate the rotor speed to a constant rate. Such means includes a variable speed control provided by the coaction of ferrous core 378 controlled by a variable magnetic force of coil 312. Current through coil 312 is controlled from the grounded armature potential through conductor 376, slip ring 352 and external speed controlling potentiometer 354 to a positive voltage on a conductor 381, in respect to the negative grounded terminal 383.

The biasing network of transistor 308 is constituted by resistors 307 and 311 in such a manner that a sufficient amount of voltage is induced in secondary transformer windings 387 to trigger thyristors 316 into a low conduction, thereby permitting a voltage to be induced in the delta connected windings of current transformers 302 which voltage is of sufficient amplitude to reach the regulated voltage level of zener diode 336. The regulated voltage through resistor 349 and conductor 306 charges capacitor 347 across the adjustable starting time rate potentiometer 344. A negative voltage from conductor 331, resistor 335 and conductor 310 is attracted to capacitor 347, so as to afford a time delay until capacitor 347 discharges at a time rate set by potentiometer 344. As the rapidly rising positive voltage increases, a slower rate of rise is achieved, and at that critical point, zener diode 328 conducts to decrease the conduction of transistor 308. The resulting decreasing load on transformer 315 results in an increased conduction through said transformer, and a less phase shifted voltage triggers thyristors 316 into a higher conduction rate. As the rotor speed increases, the centrifugal force acts on control rod 333 and ferrous cores 334 and 378 in the direction of arrow 342 until the centrifugal force is equal to the predetermined force of magnet coil 312, and the rotor speed is predetermined by the distance of removal of the ferrous cores 334 from the center of transformer coils 386 and 387. A resulting constant speed is achieved by adjusting potentiometer 354.

An instantaneous current control similar to FIG. 1 is provided, as is the regulating current feature shown in FIG. 1 to regulate the conduction of transistor 308. External current control is provided through potentiometer 350 with an adjustable time delay being afforded by potentiometer 349 and capacitor 348. Voltage divider network resistors 349 and 350 have a lower series resistance than resistor 351 and function to produce a normally negative voltage on conductor 314. As a high rotor current produces a high voltage between conductor 309 and ground potential, the negative side of capacitor 348 is charged through potentiometer 350. A positive voltage through resistor 351 charges the positive side of capacitor 348 to produce a delay. As soon as capacitor 348 discharges, the negative voltage through potentiometers 350 and 349 increases on conductor 314 to the rated conduction level of zener diode 327. The negative voltage on conductor 325 increases to regulate the conduction of transistor 308 until no more negative feedback current flows through potentiometers 350 and 349. With time rate potentiometer 349 regulated to zero time delay, the rotor-wound induction motor 301 performs with instantaneous current regulation and may be switched by a motor controller (not illustrated) to a direct reversing of the rotor speed.

FIG. 4 is a fragmentary view of a modified version of an electronic rotor control system. Since the control circuits associated with the three phases are identical, only one phase is illustrated and described. It is assumed that an overload control and starting control similar to that described in FIG. 3 functions as a control means for transistor 408 in FIG. 4 as well as for transistor 508 in FIG. 5, and is therefore omitted. A variable inductive means is shown to serve as a phase shifting means for controlling the conductance of thyristor 416 which is in series with one of the power conductors to the motor.

As the stator of the aforementioned induction motor (not illustrated) is energized, a voltage is induced in the secondary rotor circuit. The voltage appears in rotor conductors 421 and 418, and since transistor 408 at that instant represents an open circuit, the primary windings of transformer 415 represent a maximum impedance. Through voltage and transient limiting resistor 466 an AC voltage is conducted across the parallel resonating tank comprising inductor 470 and capacitor 468. The tank circuit represents a maximum impedance to the sixty hertz input of voltage. However, the resonating circuit represents a low impedance to relatively high frequency noise generated by inductive switching, and serves to conduct the inductive spikes to conductor 421. To further eliminate higher voltage transients, a bidirectional breakdown diode 457 is employed to regulate the higher voltage transients to the AC voltage level. The maximum phase shifted voltage through resistor 461 charges capacitor 417 to trigger thyristor 416 through resistor 460 into low conduction. The purpose of resistor 460, as well as resistor 560 in FIG. 5, is to reduce static charging of capacitors 417 and 517 by any internal capacitance of thyristors 416 or 516. The low current induces a voltage in the aforementioned current transformer and starting network as shown in FIG. 3. A positive voltage rises on conductor 412 to increase the conduction of transistor 408, and the increased flow of AC current through the secondary windings of transformer 415 reflects on the primary winding to lower the impedance of primary windings of transformer 415. Reduction of the impedance of the primary windings results in a decreased phase shifted voltage charging capacitor 417 and an increased conduction through thyristor 416.

An external speed control is provided to regulate the rotor speed by the function of slip ring 452 on the rotor shaft. Since potentiometer 454 is connected to ground, only one slip ring is needed where conductor 453 is connected to speed controlling potentiometer 454 having a variable resistance against ground potential.

For an emergency operation, or if only one rotor speed is desired, potentiometers 454 and 466 may be replaced with a jumper 440, or a fixed value resistor. One more means is provided for an emergency operation of the motor in case the electronic starting control or current control fails. A jumper 447 connected across the collector-emitter region of transistor 408 will bypass the transistor. The motor can be started in low speed, and controlled manually with potentiometer 454.

A constant speed feature is provided in the system of FIG. 4. Potentiometer 466 is electrically connected to the centrifugally operated plunger 433 which is connected through the sliding contact 452 to ground potential. The constant speed regulating potentiometer 466 is fastened to the epoxy mold containing the electronic rotor control circuit which is mounted on the rotor shaft. The constant speed regulator shown in FIG. 4 is adjustable by the function of the fixed adjustment screw 446 in the elongated slot 448, and speed regulating spring 430 and adjustment plate 432 pivots on the fixed fastening screw 449, and pointer 444 shows the ratio speed on dial 445. As the rotating rotor develops speed, plunger 433 is forced upward until the force on retaining spring 430 is equal to the centrifugal force. This function increases the resistance through potentiometer 466 resulting in a decreased speed which will remain at a constant rate.

FIG. 5 represents a partial view of an electomagnetic control version of a wound rotor control circuit. Instead of the function of transformer 415 in FIG. 4, variable inductor 515 is incorporated to function as a series resonance circuit with capacitor 558, and tuned for maximum resonance when ferrous core 534 is centered in inductor 515. Assuming that the stator of the rotor wound motor controlled by FIG. 5 (not illustrated) is energized, an AC voltage is induced in the secondary rotor circuit represented by conductors 521 and 518 in FIG. 5. The resulting maximum phase shifted voltage by the maximum impedance from the untuned inductor 515 triggers thyristor 516 at a minimum rate of conductance. As the aforementioned positive control voltage rises at a predetermined rate, transistor 508 is energized to conduct a DC current through a high impedance solenoid 572 from the regulated positive voltage through resistor 575, and across voltage regulating zener diode 574 to the negative grounded conductor 531. The reverse polarized diode 583 across transistor 508 serves to protect transistor 508 from inductive voltage breakdown. As the rising current increases, the magnetic force in solenoid 572, the north pole of permanent magnet 578 facing the north pole of the rising magnetic force in solenoid 572, creates a repelling motion while ferrous core 571 is attracted toward solenoid 572. The corresponding movement of control rod 533 causes ferrous core 534 to move from position C toward position D. This function causes inductor 515 to approach resonance with capacitor 558, and the resulting lowered impedance functions to reduce the phase shift of the voltage through resistors 566 and 561 charging capacitor 517, and an increased conduction occurs through thyristor 516. Damage to thyristor 516 is prevented by bidirectional breakdown diode 556.

The resulting increased speed generates a centrifugal force moving control rod 533 toward constant speed regulating solenoid 573. However, as permanent magnet 578 approaches the magnetized solenoid 573 having equal polarity, the magnetic force will counterbalance the centrifugal force acting on control rod 533. The aforementioned magnetic cores tend to assume a position predetermined by the amount of magnetic force in solenoid 573 which is regulated through slip ring 552 and a constant speed regulating potentiometer 554 regulating the DC current from the positive voltage on conductor 581 in respect to the grounded negative conductor 580. As the aforementioned stator is de-energized, transistor 508 opens to de-energize solenoid 572 and control rod 533 returns to position C of ferrous core 534 by the magnetic force of solenoid 573.

Figure 6:
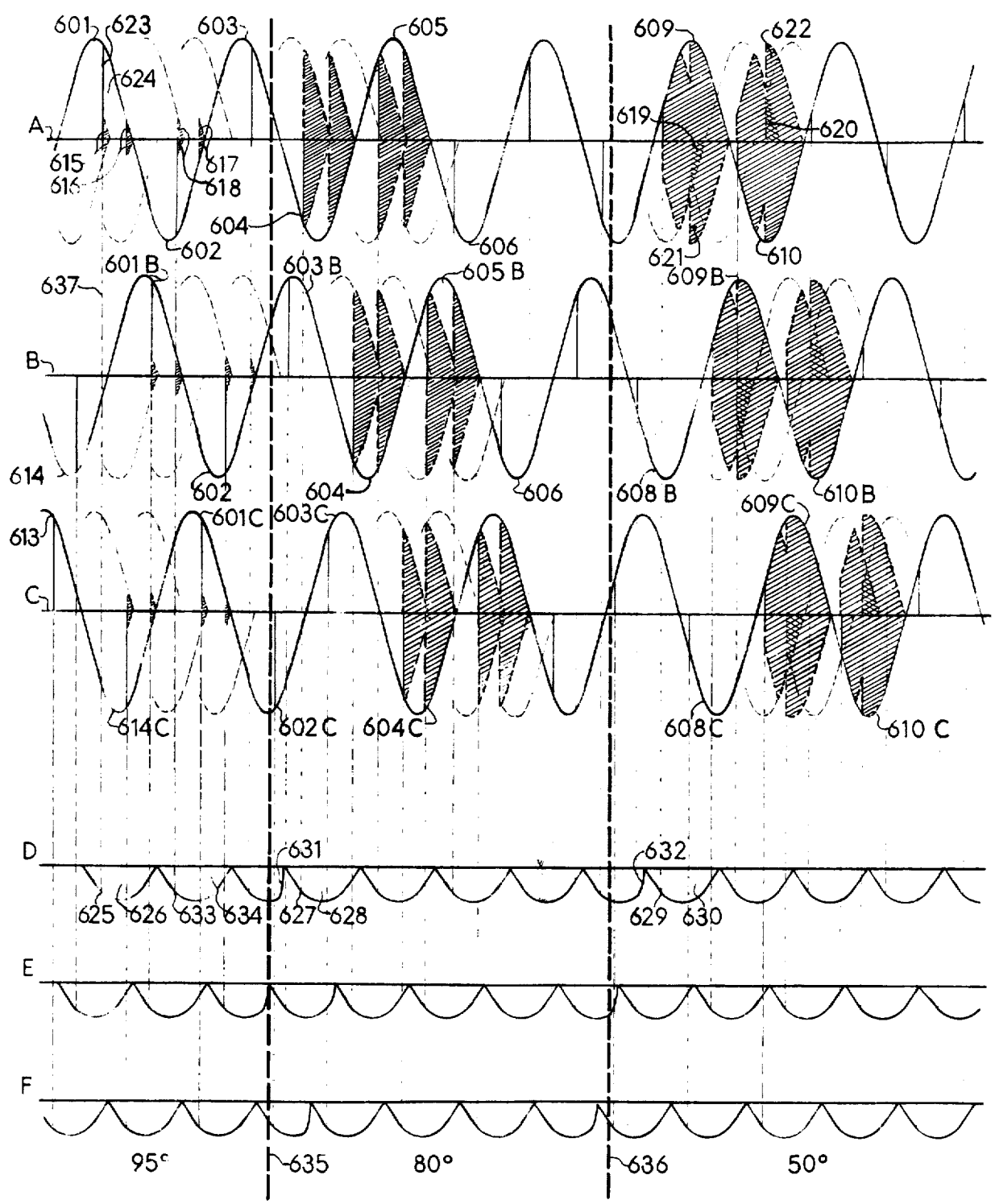
FIG. 6 is a sine wave schematic diagram showing the phaseshift method used in operating the aforementioned motor current controlling thyristors of FIGS. 1, 2, 3 and 9.

FIG. 6 is a sine wave schematic diagram showing the phaseshift method used in operating the aforementioned motor current controlling thyristors of FIGS. 1, 2, 3 and 9.

The voltage wave forms on sine wave center lines A, B and C, representing the corresponding phases of FIG. 1 motor control circuit. The negative voltage of waveform reference lines D, E and F, represents the thyristor control voltage charging capacitors 117 of FIG. 1, and have a variable phase relationship in respect to the three phase voltage of sine wave reference lines A, B and C. One positive and one negative half wave is illustrated at each of the three phase angles shown, with the opposite potential of each respective phase being superimposed with phantom lines on the opposite side of each illustrated conducting wave form as a means for easier understanding of its function.

As the positive half cycle 601 appears on phase A, the negative trigger cycle 626 on reference line D rises to reach point 625 representing the trigger level of a thyristor similar to thyristor 116 of FIG. 1, and functions to cause such thyristor to conduct the remaining portion until the positive waveform reaches zero value, which functions to turn the thyristor off. However, as the positive portion 624 is conducting, only a small portion of the conducting area 624 is rated as an effective voltage value, since the effective voltage is predetermined by the instantaneous negative value of the respective phases B and C.

As can be observed by the dotted line 637, only a small portion of the negative sine wave 614 is within the conducting phase angle of the conducting positive waveform 624, as shown by the shaded effective voltage waveform 615 which indicates the effective positive voltage, as well as the effective negative voltage shown as part of the superimposed dotted lines representing negative waveform 614 of phase B. The negative waveform 614C of phase C is also shown superimposed with a small portion of its conducting area 616 in phase with conducting positive region 624.

The next following cycle is the negative half cycle which is fired by the second negative waveform of control phase F, followed by the positive half wave 601B of phase B. As can be observed, a three phase rotating function is obtained with a low effective voltage.

As the phaseshift of the negative firing voltages of phases D, E and F are decreased from 95 to 80 degrees, a large increase occurs to the amplitude of the effective voltage as can be observed between the heavy dotted lines 635 and 636. However, the process of effective voltage distribution is the same as previously described.

The change of the trigger voltage in phase relationship to the three phase waveforms A, B and C can be observed at points 631 and 632, and appears in each of the negative waveforms D, E and F. As the aforementioned phase relationship is reduced to 50 degrees, almost 90 percent of each sine wave is conducting as effective voltage.

An added function appears at this increased rate of conduction. In referring to the conduction of positive waveform 609 of phase A, the negative potential of waveforms 608B and 608C from phases B and C are shown superimposed with dotted lines, and the effective voltage is shown as shaded area. The negative curve 608B is shown overlapping the negative curve 608C in the cross shaded area 619. Since area 619 contains the voltage distributed to the negative potential of phase B, as well as phase C, the sum of the two voltages is equal to the amount added in portion 621, which is in proper relationship to the three phase system.

Figure 7:
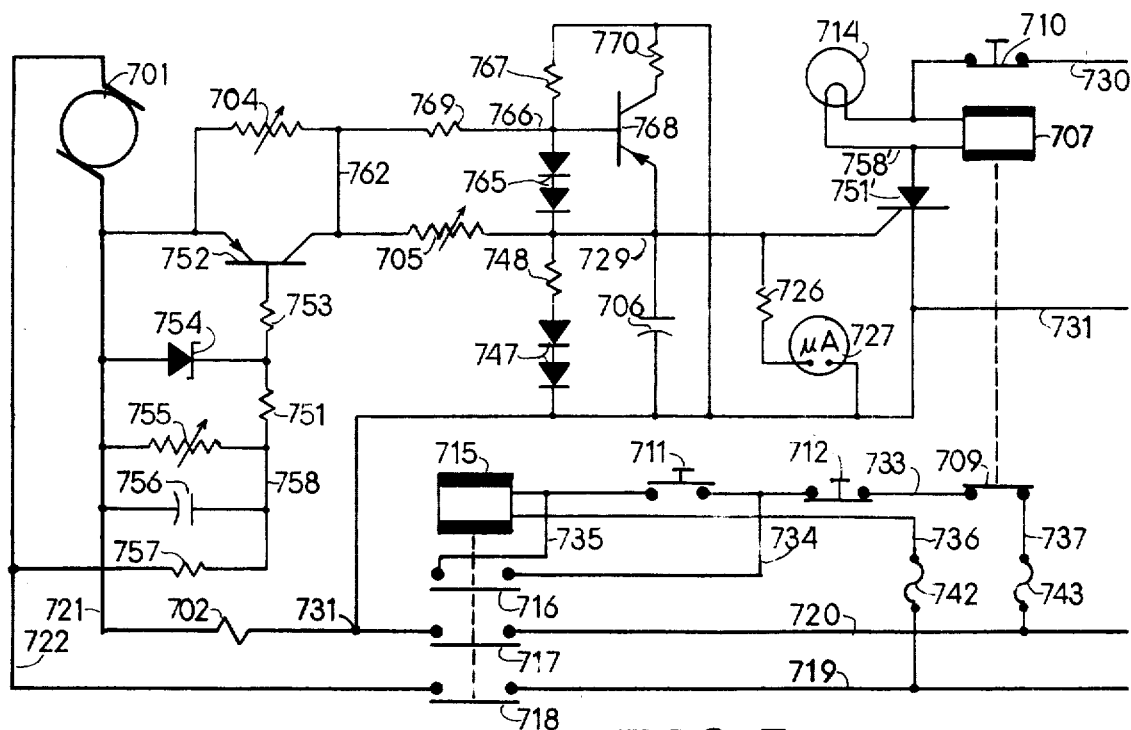
FIG. 7 is a schematic representation of a motor control overload circuit similar to FIG. 1. The control circuit is modified to control the current feeding a DC motor, and to deactivate the motor control circuit at an overload condition.

FIG. 7 is a schematic showing a modified version of the FIG. 1 overload control designed to control the overload function of a DC motor. Instead of current transformers 102 in FIG. 1, resistor 702 is provided to produce a low voltage drop for sensing the DC motor current with a more positive polarity on conductor 721 in respect to the negative voltage on conductor 731. The electronic circuit controlling transistor 52 in FIG. 1 is modified to be controlled by motor conductors 721 and 722 in FIG. 7. As the DC motor 701 is started by depressing starter button 711, contactor coil 715 is energized, closing holding contact 716 and motor starting contacts 717 and 718. The DC voltage on conductors 719 and 720 appears on conductors 722 and 731; the voltage on conductor 731 is connected through resistor 702 to conductor 721. As the negative voltage charges capacitor 756, the positive voltage on conductor 722 through motor 701 and resistor 757 charges the capacitor 756 on conductor 758 to an equal voltage value. The consequent momentary positive voltage through resistor 751 is regulated through zener diode 754. Through base current limiting resistor 753, transistor 752 is thus turned off to introduce variable resistor 704 into the overload control circuit at a set resistance value predetermined by the normal starting current of motor 701. The charged capacitor 756 discharges across variable resistor 755 at a time rate predetermined by the set resistance value thereof, which is established in accordance with the normal starting time of motor 701. Variable resistor 755 is rated at a lower value than resistor 757, and as capacitor 756 is discharged, a negative voltage appears on conductor 758. Through resistors 751 and 753, transistor 752 is saturated to bypass resistor 704, and the overload control will gain a sensitivity dictated by variable resistor 705 which is set according to the normal load current of the DC motor. The voltage through resistor 705 is regulated through diodes 747 and resistor 748, the combination of which serves as a nonlinear resistor. As a tripping-device to activate trip relay 707, a silicon controlled rectifier 751' is employed. Since the gate tripping voltage is of a very low value, diodes 747 serve the function of zener diode 47 in FIG. 1. A negative bias for a more stable turn off operation is provided through resistor 726 in series with microammeter 727. The microammeter functions as a useful motor current monitor.

As the voltage charging capacitor 706 reaches the rated "turn on" voltage of SCR 751', the self-latching SCR fires, and the negative voltage on conductor 731 appears on conductor 758'. The resulting current will illuminate trip indicator light 714, and energize trip relay 707 to open the normally closed relay contact 709 de-energizing the holding circuit for contactor relay 715. To reset the latched SCR 751', reset button 710 is depressed momentarily, and the SCR 751' is restored to the normally de-energized state. With trip relay contact 709 closed, motor 701 can be started again. The motor starting circuit controlling contactor relay 715 is energized from motor supply conductors 719 and 720 through fuses 742 and 743. As motor starting button 711 is depressed, the negative voltage on conductor 737 feeding through normally closed trip relay contact 709, conductor 733, normally closed stop-button 712 and conductor 734, energizes the coil of motor starting contactor 715 which is fed positive voltage through conductor 736. As contactor relay contacts 717 and 718 pull into start motor 701, contact 716 pulls in to bypass in to momentary start button 711, serving to latch contactor relay 715.

An electronic discharge circuit similar to the overload circuit in FIG. 1 is provided. As capacitor 706 is charged by the voltage drop across resistor 702, the positive voltage on conductor 762 is always more positive in respect to the positive voltage on conductor 729, and serves to keep the transistor 768 turned off. Diodes 765 function to protect the base emitter region of transistor 768 from a reverse voltage breakdown. As a higher voltage charges capacitor 706 close to the rated trip value of SCR 751' before decreasing to a low value, the voltage on conductor 762 decreases, and the negative voltage on conductor 731 through resistor 767 turns transistor 768 on to discharge capacitor 706 until the stored voltage on the capacitor is negative in respect to the voltage on conductor 762. The more positive voltage from conductor 762 through resistor 769 will again turn off transistor 768 permitting capacitor 706 to be charged through variable resistor 705.

FIG. 8 represents a simplified electro-magnetic version of the overload control designed to control the load current feeding a single phase AC motor.

Contact 811B of motor start button 811A serves to introduce variable resistor 804 into the overload control circuit as motor 801 is being started, and functions similar to the electronic circuit controlling transistor 752 in FIG. 7, as a time delay provided by resistor 755 in FIG. 7. Push button 811 must be depressed for a time required by motor 801 to reach a near full speed. Trip relay 807 is provided to serve the function of silicon controlled rectifier 751' in FIG. 7.

To afford a latching function in trip relay 807, a positive voltage is provided on conductor 830 in respect to the common negative conductor 831. The voltage rises on conductors 825 and 862 from an excessive motor current through motor 801 feed conductors transmitted through current transformer 802, and the high voltage exceeds the rated time delay of resistor 805 and capacitor 806. The voltage between conductors 829 and 831 rises to energize trip relay 807, and as relay contact 809B opens to de-energize motor contactor relay 815, relay contact 809A closes to illuminate trip indicator light 814. The positive voltage through blocking diode 813 functions to retain trip relay 807 in a latched state until reset by depressing of the normally closed push button 810. During normal operation the blocking diode 813 prevents the positive voltage on conductor 829 from flowing to the negative conductor 831 through trip indicator light 814.

A thyristor controlling means similar to FIG. 3 is shown in FIG. 9 controlling the function of a DC motor. Armature 901 is shown fed by a three phase thyristor controlled circuit similar to as shown in the aforementioned control circuit FIG. 1. Area 921 shown in phantom lines represents the control circuit and variable transformer 115 of FIG. 1, and said transformer may be provided to function with the inductive control means as shown controlling transformer 915 in FIG. 9. An overload control circuit similar to FIG. 1 operated by current transformers 102 in FIG. 1 is represented by the dotted line area 922, and is operated by current transformer 902. The three phase voltage produced in conductors 921B by thyristors 916B is rectified through full wave rectifiers 923 to energize DC armature 901. The AC ripple of the rectified DC current in conductors 939 is induced in current transformer 902 which is rectified to feed back through the aforementioned described means.

A circuit similar to that feeding DC motor armature 901 feeds DC motor shunt winding 927. A DC polarity reversing means is provided for reversing the direction of rotation of DC motor armature 901 by the function of the double-pole double-throw relay contacts 926 operated by relay 929 which can be operated by forward and reverse speed potentiometer 905, when the DC current through shunt winding 927 is at maximum rate only, which corresponds to the lowest speed of DC armature 901. To increase the speed in the forward direction, pointer 906 of potentiometer 905 is turned counter-clockwise, decreasing the resistance to increase the magnetic field of solenoid 912. The resulting function attracts ferrous core 978 to lift control rod 933 upward, serving to decrease the magnetic conduction through transformer 915, and to increase the phase shift of the control voltage regulating thyristors 916A to a lower rate of conduction. The resulting lower current through shunt winding 927 increases the speed of the DC motor armature 901. To reverse direction of motor rotation, the pointer 906 of potentiometer 905 is turned clockwise, decreasing the motor speed. As potentiometer 905 is centered, minimum motor speed is obtained with maximum current in shunt winding 927. As pointer of potentiometer 905 is turned further clockwise, switch 930 is closed by the pointer arm 906 and relay 929 activates by the double-pole double-throw switch 926 serving to reverse the polarity of the DC voltage feeding shunt winding 927.

Figure 10:
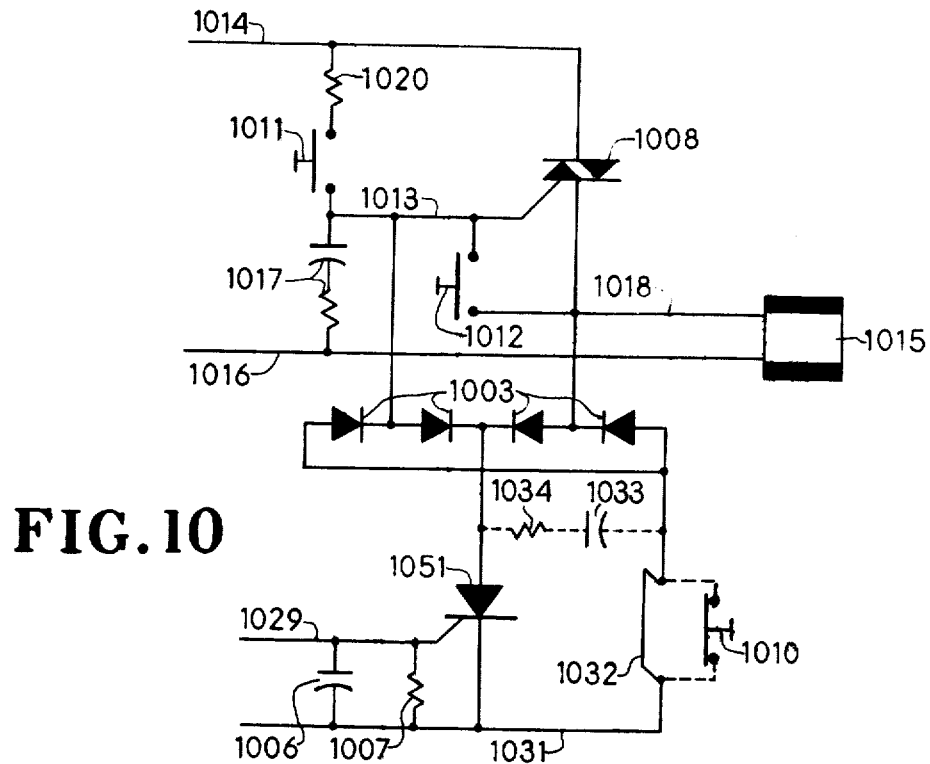
FIG. 10 is a fragmentary illustration showing an AC relay contactor with a manually operated solid state control circuit, and overload trip controlled by a circuit similar to circuits as shown in FIG. 1 and FIG. 7.

FIG. 10 shows bidirectional thyristor 1008 controlling the function of electro-magnetic contactor relay 1015 in a similar manner to the control circuit shown in FIG. 7. The control circuit shown operating the bidirectional thyristor 1008 is a manufacturer's circuit which is modified to be overload tripped by a circuit similar to FIG. 7 where silicon controlled rectifier 751 is represented as the SCR 1051 in FIG. 10. Instead of DC motor load resistor 702 in FIG. 7, a single phase current transformer and the associated circuitry of FIG. 1 is assumed to be applied to the function of FIG. 10 overload control.

As motor contactor relay 1015 is energized by depressing push button 1011, thyristor 1008 switches on with a self-latching function provided by resistor-capacitor circuit 1017 to energize contactor relay 1015. The overload trip means is accomplished by the function of SCR 1051 which serves to short the DC voltage rectified by full wave rectifiers 1003 when SCR 1051 is tripped by the motor overload control charging capacitor 1006. A self-resetting overload trip function is achieved in this manner. However, if a latching function is desired, capacitor 1033 in series with resistor 1034 to prevent instantaneous discharge is employed to reduce the AC ripple resulting in a latching function of SCR 1051. Jumper 1032 is then removed, permitting push button 1010 to function as an overload trip resetting means.

Figure 11:
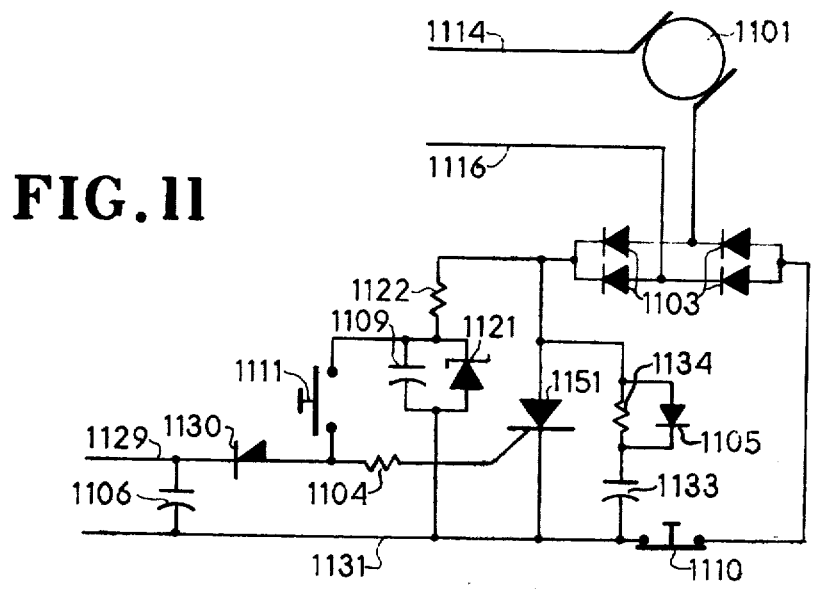
FIG. 11 is a simplified fragmentary illustration similar to FIG. 10, overload trip controlled by a circuit similar to as shown in FIG. 1.

FIG. 11 is a circuit showing a thyristor representing a gate controlled switch or GCS controlling the function of a single phase AC-DC motor, in a similar manner as bidirectional thyristor 1008 controlling electro-magnetic contactor relay 1015 in FIG. 10.

An AC or DC voltage can be applied to conductors 1114 and 1116, and during AC operation, a full cycle performance is obtained by the function of full wave rectifiers 1103 which, being in series with GCS 1151, functions to provide a higher voltage breakdown performance than thyristor 1008. Full wave rectifiers 1103 in series with GCS 1151 also function to block the high inductive reverse voltage which occurs during the fast switching of the inductive load of motor 1101.

To prevent a voltage feedback through thyristor diode 1130 when a starter button 1111 is depressed, a regulated voltage is obtained through resistor 1122 across zener diode 1121 and capacitor 1109, serving to provide a low gate trigger voltage and sufficient gate current.

As push button 1111 is depressed, the positive voltage through resistor 1104 turns on gate controlled switch 1151, having a latching function as a result of ripple reducing capacitor 1133, which serves to maintain a minimum holding current, by the function of the delayed discharge of capacitor 1133 through resistor 1134. The circuit comprising capacitor 1133, resistor 1134 and diode 1105 also represents the manufacturer's recommended circuit for providing a capacitor shunt to increase gate turn off ability.

An electronic overload control similar to that used in the FIG. 1 motor controller is assumed to be applied through the function of a single phase current transformer applied to conductor 1116 or 1114.

Assuming that motor 1101 approaches an overloaded condition, capacitor 1106, which corresponds in function to capacitor 6 in FIG. 1, is charged to the switching level of thyristor diode 1130. The gate controlled switch 1151 is a thyristor which is different from the aforementioned silicon controlled rectifier in that the GCS 1151 can be turned off with a predetermined value of negative gate voltage and current.

As thyristor diode 1130 switches on, the stored voltage in capacitor 1106 is discharged through gate current limiting resistor 1104 to turn off GCS 1151.

Figure 12:
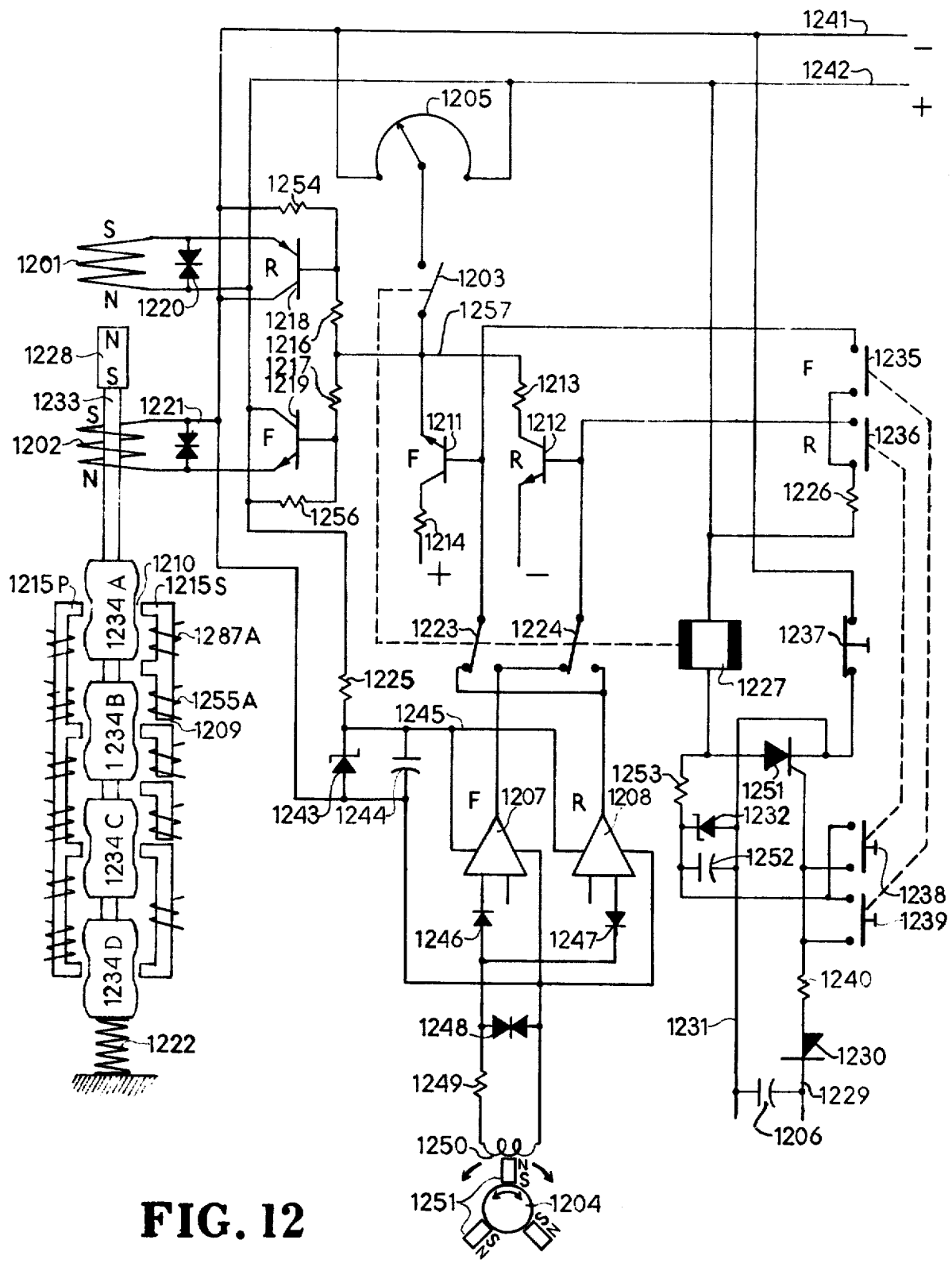
FIG. 12 is a fragmentary view showing a selective transformer having a variable magnetic control means.

FIG. 12 represents an electronic motor braking means controlling a selective transformer similar to that shown in FIG. 2. A magnetic operating means is shown controlling ferrous cores 1234, and spring 1222 is provided to retain the ferrous cores in the center off position when magnetic control solenoids 1201 and 1202 are de-energized. Air gaps 1209 are provided as an equal distribution means of the magentic lines of force between phase A and phase C on the secondary side of transformer 1215. Air gap 1209 represents a magnetic resistance similar to air gap 1210 when cores 1234 are in the position shown in FIG. 12. When the peak magnetic flux occurs between phase A and phase C, ferrous cores 1234 are moved upward by an increased repelling force caused by an increasing magnetic force in solenoid 1202 that is polarized to repel permanent magnet 1228. Meanwhile, the magnetic flux through solenoid 1201 decreases in opposition to the equal polarity faced by permanent magnet 1228. A resulting firm upward motion functions to place ferrous core 1234B across the secondary windings 1255A of phase A. The magnetic lines of force through the secondary side of transformer 1215 encounter the resistance of air gap 1209 which functions to partially divert magnetic flux across the parallel path of ferrous core 1234B. This has a cancelling effect to the induced voltage in secondary windings 1255A, as described in the FIG. 2 detailed description.

An electronic braking system of the aforementioned electric motor is accomplished by the function of permanent magnets 1251 shown fastened to the rotor shaft. The permanent magnets 1251 are mounted with the same magnetic polarity facing induction coil 1250, and as the magnetic poles rotate with the rotor shaft, a pulsating DC voltage is generated in electromagnetic induction in coil 1250.

Since the polarity of the induced voltage is predetermined by the direction of movement of the permanent magnets across induction coil 1250, the forward and reverse directions of the rotor are represented by respective positive and negative voltages.

As the aforementioned motor is started forward, push button 1239 with ganged auxiliary contact 1235 is depressed. A positive voltage from conductor 1242 through relay coil 1227 is regulated across voltage reference diode 1232 through resistor 1253, and by the function of capacitor 1252. The lowermost regulated voltage provides sufficient current to trigger gate controlled switch 1251 through the depressed start button 1239. As GCS 1251 latches, the negative voltage on conductor 1241 through stop switch 1237 energizes relay coil 1227 and causes relay contacts 1203, 1224 and 1223 to pull in. Since auxiliary push button switch 1235 also is depressed, the positive voltage from conductor 1242, through base current limiting resistor 1226, turns on forward speed transistor 1211. Consequently, the positive voltage through current limiting resistor 1214 produces a positive voltage on conductor 1257, the magnitude of which is predetermined by the set value of potentiometer 1205. Transistors 1218 and 1219 are each forward biased through resistors 1254 and 1256, respectively, to generate an equal magnetic force in each of the solenoids 1201 and 1202.

As the positive voltage on conductor 1257 feeds through base current limiting resistors 1216 and 1217, the positive voltage increases the conduction forward speed transistor 1219 while reverse transistor 1218, being a PNP transistor, decreases its conduction.

The increased current through solenoid 1202 creates a magnetic force with its south pole facing the south pole of permanent magnet 1228. The equal polarity functions to create an upward motion, and as the current through solenoid 1201 decreases, a lesser force resists upward movement of permanent magnet 1228. As a result, a firm and accurate control of selective transformer 1215 is achieved by controlling the voltage level on conductor 1257.

As soon as the aforementioned motor as in FIG. 1 has obtained rotating motion, permanent magnets 1215 induce a DC voltage in induction coil 1250 that is more positive in respect to negative conductor 1241, and through resistor 1249, the voltage is regulated across a bidirectional voltage reference diode 1248 to a specific voltage level. Such specific voltage operates foward speed linear amplifier 1207 through negative voltage blocking diode 1246. A resulting positive voltage is produced by the amplifier, and since relay contact 1223 is closed by relay-coil 1227, the positive voltage feeds through contact 1223 to energize forward control transistor 1211, providing a positive voltage through resistor 1214 for forward operation of transistor 1219.

The motor can be stopped by depressing the normally closed stop button 1237 to unlatch gate controlled switch 1251, or a turn off may occur by the function of an overload control as provided in FIG. 1, to provide a turn off function similar to as described in the FIG. 11 turn off circuit.

As relay coil 1227 is de-energized, relay contact 1203 opens to disconnect the speed-controlling voltage from potentiometer 1205, and relay contacts 1223 and 1224 are switched to the de-energized position illustrated in FIG. 12. As can be observed, a reversing function is accomplished by switching the positive output voltage from forward amplifier 1207 to energize reverse control transistor 1212, thereby switching negative voltage through current limiting resistor 1213 to saturate reverse transistor 1218 for instantaneous reverse operation of selective transformer 1215.

The reversing time required is predetermined by the adjusted value of the instantaneous current control means similar to as described in the FIG. 1 detailed descriptions. At the instant the motor approaches zero speed, permanent magnets 1251 no longer induce voltage in induction coil 1250, and the motor comes to full stop. If attempt is made to turn the rotor shaft while relay coil 1227 is de-energized, whether in a forward or reverse direction, the movement is opposed by a counter-movement with a speed approximately equal to attempted movement of the rotor shaft, since the voltage amplitude induced in induction coil 1250 is linearly proportional to the rate of speed, and the polarity of the induced voltage predetermined by the direction of armature rotation.

Amplifiers 1207 and 1208 are linearly proportional to the input voltage, and are switched inverted in respect to control transistors 1211 and 1212 while relay coil 1227 is de-energized, serving as an opposing means to the movement of the rotor shaft.

Bidirectional breakdown diodes 1220 and 1221 serve as inductive voltage surge protectors for transistors 1218 and 1219, respectively.

The reversing capability of the FIG. 12 circuit can be adapted to the non-mechanical transformer flux control circuit of FIG. 1. Forward transistor 1219 and reverse transistor 1218 are controlled as described above in conjunction with FIG. 12. The outputs of the forward and reverse transistors are connected to control the phasing of the flux in the transformer corresponding to transformer 115 in FIG. 1. Forward transistor 1219 is connected to drive first or second secondary windings and reverse transistor 1218 is connected to drive the first secondary winding and a third secondary winding. The second secondary winding is associated with the phase that leads the phase associated with the first secondary windings, and the third secondary winding is associated with the phase that lags the phase associated with the first winding. The remaining functions, e.g., starting and overload protection, are achieved through transistor 108, which is controlled as described in conjunction with FIG. 1. Transistors 1218 and 1219 each control the current in two secondary windings, whereas transistor 108 controls current flow in all secondary windings.

While I have shown and described specific embodiments of my invention, I am aware that many modifications may be made without departing from the spirit of the invention. To mention as a typical example, I like to refer to the motor overload controls of FIGS. 7 and 8. The motor current sensing resistor 702 of FIG. 7 may readily be applied to the current control of an AC motor, and the AC voltage drop across the said resistor rectified in similar manner as current-transformer 802 in FIG. 8. Therefore, I do not intend to limit may invention to the specific arrangements shown.

What is claimed is:

1. Apparatus for controlling a piece of electrical equipment of the type having at least first and second power input connections comprising a bidirectional thyristor in series with said first power input connection, said thyristor having a gate terminal for controlling the current flow therethrough in response to an electric signal applied to said gate terminal, a transformer having a secondary winding connected to said gate terminal, said transformer having a primary winding and a core for flux linking said primary and secondary windings, means including a series resistor for connecting said primary winding across said first and second power input connections so as to cause a variable alternating voltage across said primary winding, an auxiliary winding on said core in flux linking relation to said primary and secondary windings, variable resistance means in series with said auxiliary winding for limiting current flow through said auxiliary winding, and means for controlling said variable resistance means in accordance with the load demands of said equipment, said series resistor affording development of a voltage across said primary winding that corresponds to said variable resistance to avoid saturation of said core.

2. Apparatus according to claim 1 wherein said means for controlling said variable means comprises manually operated start and stop means for respectively activating and deactivating said means for controlling said variable resistance means.

3. Apparatus according to claim 2 including means responsive to said start means for producing a voltage that rises at a predetermined rate, means for adjusting the predetermined rate, and means for connecting said voltage producing means to said means for controlling said variable resistance means so that the resistance thereof rises in correspondance with the output of said voltage producing means.

4. Apparatus according to claim 1 including means for sensing the current flow through one of said power input connections, and means connecting said current flow sensing means to said means for controlling said variable resistance means for increasing the resistance thereof in response to sensing of a predetermined maximum current by said sensing means so as to cause said thyristor to limit the current flow therethrough.

5. The apparatus defined in claim 1 in combination with an AC induction motor having an armature wherein a majority of the components of said apparatus are mounted directly on said armature and said apparatus has its thyristor connected to control currents in said armature, said armature having a plurality of slip rings connected to the components of said apparatus and said AC motor having a plurality of brush means cooperating with said slip rings to communicate external control signals and power to said components of said apparatus mounted on said armature.

6. An electronic controller for a three phase motor of the type having a power input connection for each of the three phases comprising first, second and third bidirectional thyristors in series with respective said input connections; a transformer having first, second and third secondary windings connected to the gate terminals of the respective thyristors, said transformer having first, second and third primary windings and a core for flux linking said primary and secondary windings; first, second and third dropping resistors in series with respective said primary windings to form first, second and third series combinations; means for connecting respective said series combinations to the respective power conductor phases; at least one auxiliary winding on said core in flux linking relation to said primary and secondary windings, a variable resistance means in series with said auxiliary winding for limiting current flow through said auxiliary winding, and means for controlling said variable resistance means in accordance with the load demands of said equipment, said series resistors affording development of voltages across respective said primary windings that correspond to said variable resistance to avoid saturation of said core.

7. A controller according to claim 6 wherein said controller comprises a first core portion associated with said primary windings, a second core portion associated with said secondary windings, a third core portion intermediate said first and second portions and moveable between a maximum position affording maximum flux linkage between said first and second core portions and a minimum position affording minimum flux linkage between said first and second core portions, and means for moving said third core portion between said maximum and minimum positions.

8. Apparatus for controlling a piece of electrical equipment of the type having at least first and second power input connections comprising a bidirectional thyristor in series with said first power input connection, said thyristor having a gate terminal for controlling the current flow therethrough in response to an electric signal applied to said gate terminal, a transformer having a secondary winding connected to said gate terminal, said transformer having a primary winding and a core for flux linking said primary and secondary windings, means including a series resistor for connecting said primary winding across said first and second power input connections so as to cause a current flow through said primary winding, and means for controllably varying the degree of flux linkage between said primary and secondary windings so as to control the current induced in said secondary winding, said transformer core including a first portion associated with said primary winding, a second portion associated with said secondary winding, and a third portion intermediate said first and second portions and movable between a maximum position affording maximum flux linkage between said first and second portions and a minimum position affording minimum flux linkage between said first and second positions, and wherein said flux linkage varying means includes means for moving said third core portion between said maximum and minimum positions.

9. Apparatus according to claim 8 wherein said third core portion moving means comprises a magnetizable slug fastened to said third core portion, an electromagnetic coil mounted in magnetic communication with said slug, and means for controllably supplying current to said electromagnetic coil.

10. Apparatus according to claim 9 wherein said current supplying means comprises manually operated start means to energize said electromagnetic coil to move said third core portion toward said maximum position.

11. Apparatus according to claim 10 including means responsive to said start means for producing a current to said electromagnetic coil that rises at a predetermined rate and means for adjusting the predetermined rate.

12. Apparatus according to claim 10 including temperature sensitive means in series with said current supplying means for resisting current flow in proportion to the temperature thereof, means connected to the piece of electrical equipment for producing heat energy when the equipment is supplied with power through said thyristor, and means for communicating heat energy between said heat energy producing means and said temperature sensitive menas, said heat communicating means affording a time delay corresponding to the warm-up time of the piece of equipment so that full rated current to the equipment is supplied only after the warm-up time.

13. Apparatus according to claim 10 wherein said piece of electrical equipment is a motor having a shaft, said third core portion, said slug and said electromagnetic coil being mounted on said shaft for rotation therewith, means including a slip ring in series with said current supplying means for connecting said current supplying means to said coil, said slug and coil being mounted on said shaft so that the direction of magnetic interaction therebetween is opposite the direction of centrifugal force imposed on said slug by rotation of said shaft.

14. Apparatus for controlling a piece of electrical equipment of the type having at least first and second power input connections comprising a bidirectional thyristor in series with said first power input connection, said thyristor having a gate terminal for controlling the current flow therethrough in response to an electric signal applied to said gate terminal, a transformer having a secondary winding connected to said gate terminal, said transformer having a primary winding and a core for flux linking said primary and secondary windings, means including a series resistor for connecting said primary winding across said first and second input connections so as to cause a current flow through said primary winding, means including an auxiliary winding on said core for varying the flux linkage between said primary and secondary windings, and means for controllably supplying current to said auxiliary winding in accordance with the load conditions on the electrical equipment, said current supplying means including a control current source, output means that controls said current supplying means in proportion to the magnitude of the control current, temperature sensitive means in series with said control current source for resisting current flow in proportion to the temperature thereof, means connected to the piece of electrical equipment for producing heat energy when the equipment is supplied with power through said thyristor, and means for communicating heat energy between said heat energy producing means and said temperature sensitive means, said heat communicating means affording a time delay corresponding to the warm-up time of the piece of equipment so that the full rated current to the equipment is supplied only after the warm-up time period.

* * * * *